March 10, 1931. H. ADAMS 1,795,989
APPARATUS FOR LOWERING AND MIXING FLOWABLE SOLID MATERIAL
Filed Feb. 21, 1929
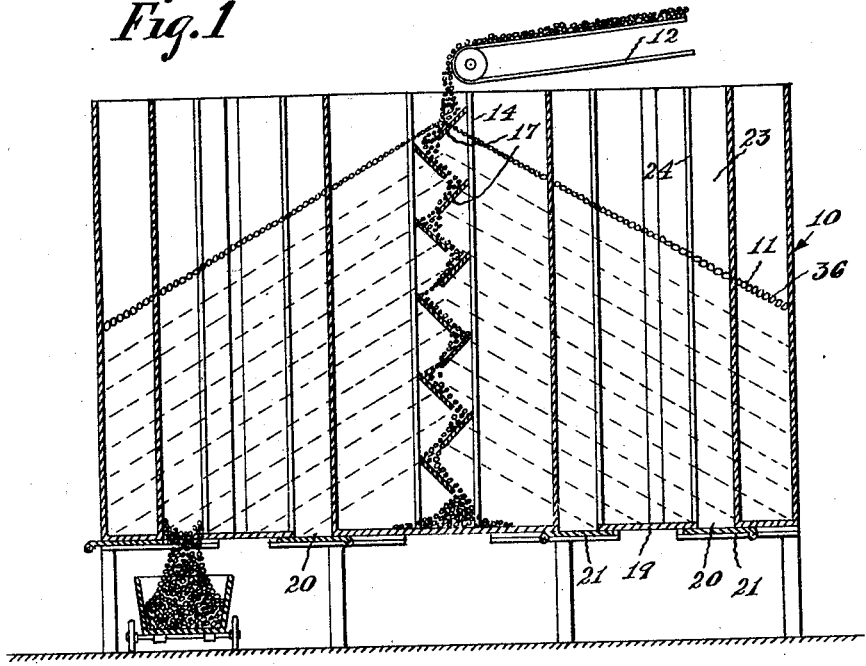
INVENTOR
*Henry Adams,*
BY
*Harold D. Penney* ATTORNEY

UNITED STATES PATENT OFFICE

HENRY ADAMS, OF PLAINFIELD, NEW JERSEY, ASSIGNOR TO ADAMS COAL MACHINERY COMPANY, OF PLAINFIELD, NEW JERSEY, A CORPORATION OF CONNECTICUT

APPARATUS FOR LOWERING AND MIXING FLOWABLE SOLID MATERIAL

Application filed February 21, 1929. Serial No. 341,653.

This invention relates to an apparatus for storing flowable solid friable or durable material and more particularly to means for filling bins, pockets or the like with coal or similar broken material, and removing it therefrom, though it is noted that the invention is not limited to broken material or storing.

One object of this invention is to provide an apparatus of this kind whereby material being composed of fines and larger pieces or composed of fines, medium size pieces and large pieces may be stored and later withdrawn and thereby uniformly well mixed in any desired proportion.

Another object of this invention is to provide an apparatus of this kind for mixing the fines, medium pieces and larger pieces in which the mixing takes place as soon as the initial withdrawal commences.

Another object of this invention is to provide improvements of the apparatus shown in my United States Patents No. 1,234,709 and No. 1,234,710 issued July 31st, 1917, and my application Serial No. 226,167 filed October 14th, 1927, whereby the coal or the like lowered into a bin or the like in any manner may be withdrawn in a well mixed condition, the new apparatus giving a new mixing function prior to and additional to the mixing which takes place in the withdrawal chutes of the apparatus in said patents and application.

Another object is to improve generally the simplicity and efficiency of such apparatus and to provide an economical and reliable apparatus of this kind, and to provide an apparatus which is economical, durable and reliable in operation and economical to erect.

Other objects of this invention will appear as the description proceeds and while herein details of the invention are described and claimed the invention is not limited to these since many and various changes may be made without departing from the scope of the invention as claimed in the broader claims.

The inventive features for the accomplishment of these and other objects are shown herein in connection with an improved lowering and mixing apparatus which, briefly stated, includes a bin for flowable solid material having a filling means near the center thereof and two pairs of outlet openings remote from said filling means and the walls of the bin. An upright withdrawal chute is disposed over each opening and has an unclosed side; and upstanding wing baffles join the edges respectively of the unclosed sides to form a mixing space between the chutes of each pair, and a pair of mixing gates remote from the chutes.

The material lowered by the filling means forms a body of the flowable solid material, the fines sinking at the filling means, the large pieces moving remote from the fines, and medium pieces stopping between the large pieces and fines. Withdrawal of material at the outlet openings, which are near the medium pieces is limited by the withdrawal chutes to a column over the outlet, the fines, medium pieces and large pieces moving along the top of the body to the mixing gates of the mixing space, and there carrying said pieces and fines together from said gates to the tops of the adjacent column.

Thus the method includes gradually lowering in any manner the coal or other flowable solid material in order to form a pile or body of material in the bin. The material comprises various sizes and as the pile is being formed the fines sink nearest the point of lowering while the larger pieces roll away towards the outside of the pile. Generally speaking the fines remain near the center of the pile or along a line crossing the center of the pile and the larger pieces move towards the outside rim of the pile and in this manner the pile of coal is built up to the desired height in the bin.

When the material is withdrawn from the pocket, the withdrawal is limited to a column approximately over the outlet or outlets. The outlet may be placed at any point underneath the pile.

The material is fed to the withdrawal column from all along the top only of the body of material, as explained in my first named patent; but in the present apparatus, by means of the wing baffles, the coal or material near the center of the pile is made to travel in the direction desired and the distance necessary in order that the finer material may be caught and carried along with the larger pieces when the latter join them, and all are carried along together, and mixed by rolling action, to the withdrawal column over the outlet where they leave as a uniformly mixed body.

It is obvious that more than one outlet may be placed underneath the pile of the coal or other material, in which case a number of wing baffles may be placed preferably on the withdrawal chutes so that the coal flowing to the said chutes will be guided along certain lines and certain distances so that the larger pieces near the outside of the pile will, when rolling and guided toward the chutes, carry along the fines and smaller pieces and be well mixed with them when the mixture reaches the withdrawal column and outlet.

In the accompanying drawing showing, by way of example, one of many possible embodiments of the invention, Fig. 1 is a longitudinal vertical sectional view, partly in elevation, showing the coal bin with coal and the lowering and withdrawing means therein, the section being taken substantially on the line 1—1 of Fig. 2, looking in the direction of the arrows of said line; and Fig. 2 is a plan of said bin and means.

My improved apparatus is shown herein in combination with a bin 10 for coal or other flowable solid material 11 brought thereto by a conveyor 12.

A vertical filling chute 14 near the middle of the bin comprises opposite side walls 15 (Fig. 2), two sides 16 of the chute being substantially unclosed from top to bottom.

Downwardly and inwardly pointed staggered baffles 17 receive and gradually lower the material received from said conveyor.

The floor 19 of the bin has two pairs of rectangular openings 20 horizontally alined with the bottom of the chute 14 about equal distances from the chute and each other and spaced from the adjacent side walls of the bin, and closed by slide doors 21.

Vertical side walls 22 and a back wall 23 on the edges of each opening 20 define a vertical withdrawal or delivery chute 23 each having an unclosed side 24 adjacent to said unclosed side of the other delivery chute of the same pair.

Vertical corner strips 25 on the two corners of each opening adjacent to the edges of unclosed side define a separation plane between the exterior and interior of the chute.

Wide upstanding wing baffles 28, 29 as high as the material in the bin and joining the respective corners 25 at the enclosed sides of the withdrawal chutes, extend outwardly from the space 30 between each pair of withdrawal chutes and converge toward, and terminating short of, the corresponding wing baffle of the adjacent chute, to form a mixing gate 31 between the free edges of the baffles 28, 29 and a mixing space 30 enclosed by the wing baffles.

The material overflows at the unclosed side 16 of the filling chute until the material is piled high up, the fines sinking in and near the discharge chute within an area generally defined by the dotted line 35, the large pieces 36 moving to remote parts of the bin, the intermediate pieces remaining in and near said spaces 30, the walls of the bin limiting the material being stored to a large column.

The strips 25 and walls of the withdrawal chute limit the material being delivered to the column, downwardly moving in free contact at one side 24 with coal of the main body of the material in said mixing space 30. To the top only of said column is fresh material fed. The large pieces 36, the fines and the medium size pieces of the top layer of the main body pass in at the gates 31 and are thoroughly mixed in said mixing space before being fed to the top of the withdrawal column.

The material below the top of the pile and adjacent to the open sides 24 at said strips 25 forms a barrier preventing flow into the column except at the top.

The horizontal width of said wing baffles 28 adjacent to the fines is made greater or less as compared with the other wing baffles 29, depending upon the proportion of fines desired in the withdrawal mixture, the shorter the baffles 28 adjacent to the fines, the more fines being included.

The operation is as follows:

The coal or other material is brought to the bin for storage by the conveyor 12 and is lowered into the bin by means of the chute 14 commonly known as a telegraph or trickler, but it is understood that this means of lowering is selected only by way of example. The coal may be lowered by a spiral or series of spirals or it may be lowered by avalanche chutes as described in my co-pending application, Serial No. 168,985, filed Feb. 17, 1927, or it may be lowered by any design of the slide chute or conveyor or bucket.

The coal lowered down the chute 14, on reaching the bottom, piles up, building up a pile of cone-like shape, as shown in Fig. 1, until it reaches the desired height. The finer material sinks near and around the points of entry or in other words, around the chute 14, the approximate limit of the pile of fines being shown by the dotted line 35, the largest pieces 36 being the furthest away from the center.

The operation of withdrawing proceeds as follows:

Any one of the openings 20 is opened to allow the material to be withdrawn, the material entering the withdrawal column only from the top of the pile in the pocket as is fully described in my previous Patent, No. 1,234,709. The fine material rolling or sliding will follow the course shown by the dotted line 38, the coarser material rolling or sliding as shown by dotted line 39, and when the different materials meet at the opening 31 they will be mixed, the medium sized materials moving in along the path 40, the mixture then moving towards the withdrawal chute.

In this manner, the material is thoroughly and well mixed and insures withdrawing a uniformly well mixed body of material. The width of the wing baffles 28, 29 depends upon the size of the bin and the length of the distance of travel necessary in order to bring together all the different sizes, the height of the wing baffle plates depend upon the height of the material in the bin or the height of the bin itself, and the location depends on the size of material and the mixture desired to be withdrawn.

As the fines are deposited near the filling chute 14, the large pieces near the walls of the bin and the medium size pieces in and near the space 30 and gate 31, the withdrawal chutes will first be filled with medium sized pieces, and the first withdrawal will be medium sized pieces, later to be followed by withdrawal of mixture.

It is obvious that although the apparatus as described is now used in carrying out this method, I do not limit myself to this design of apparatus in all cases; but in the developing and reducing to actual practice this method, which is now in daily use, I have used the apparatus as above described.

I claim as my invention:

1. An apparatus for mixing and withdrawing flowable solid material from a pile having therein large and small pieces remote from each other and medium size pieces substantially between the large and small pieces; outlet means for withdrawing material from beneath the material; means for limiting the withdrawal through said outlet to an upright withdrawal column over the outlet means; and means for guiding the pieces to a common mixing point remote from the column and thence to the top of the column.

2. An apparatus comprising means for lowering mixed flowable solid material to form a pile, the fines sinking near said means, the large pieces moving over the pile remote from the fines, and the medium pieces to a position substantially between the large pieces and fines; a pair of door controlled outlets for withdrawing material beneath the medium pieces; means for limiting the withdrawal to an upright withdrawal column over the two outlets respectively; and gates for guiding the fines, medium pieces and large pieces moving along the top of the body to a mixing point remote from the two columns and thence to the tops of the columns, thus mixing them.

3. An apparatus comprising means for lowering mixed flowable solid material to form a pile, the fines sinking near said means, the large pieces moving over the pile remote from the fines, and the medium pieces to a position between the large pieces and fines; outlet means for withdrawing material beneath the medium pieces; means for limiting the withdrawal to an upright withdrawal column over the outlet means; and means for guiding the fines, medium pieces and large pieces moving along the top of the body to a pair of mixing points remote from the column and thence to the top of the column, thus mixing them.

4. In combination, a bin for flowable solid material and lower outlet openings; filling means in the bin; withdrawal chutes over said openings respectively each having an unclosed side and upstanding means joining the edges of the unclosed sides to form a mixing space; and a gate remote from the chute, the filling means and the walls of the bin.

5. In combination, a bin for flowable solid material; filling means therein; the bin having pairs of separated outlet openings remote from said means and the walls of the bin; a withdrawal chute over each opening having an unclosed side facing the unclosed side of the chute of the same pair; wide upstanding wing baffles as high as the material in the bin and joining the respective edges of enclosed sides of the withdrawal chutes and extending outwardly from the space between each pair of withdrawal chutes and converging toward, and terminating short of, the corresponding wing baffle of the adjacent withdrawal chute, to form a mixing gate between the free edges of the baffles and a mixing space enclosed by the wing baffles.

6. In combination, a bin for flowable solid material, comprising side walls and a floor; a vertical filling chute near the middle of the bin comprising opposite side walls, two sides of the chute being substantially unclosed from top to bottom; downwardly and inwardly pointed staggered baffles for gradually lowering the material in said filling chute; said floor having two pairs of rectangular openings remote from the filling chute and the adjacent side walls of the bin and slightly greater distances from each other; vertical walls on the edges of said opening to define a vertical withdrawal or delivery chute each having an unclosed side adjacent to said unclosed side of the other delivery chute of the same pair; vertical corner strips on the two corners of each opening adjacent to the edges of the unclosed side; and upstanding means joining the edges of the unclosed sides to form a mixing space, and gates remote from all the chutes.

HENRY ADAMS.